United States Patent

Dixon et al.

[15] 3,648,776

[45] Mar. 14, 1972

[54] STIMULATING PRODUCING WELLS WITH CHROMIC ACID

[72] Inventors: William H. Dixon, Littleton, Colo.; Marathon Oil Company, Findlay, Ohio

[22] Filed: July 6, 1970

[21] Appl. No.: 52,712

[52] U.S. Cl. .................................................166/307
[51] Int. Cl. ..................................................E21b 43/27
[58] Field of Search ...............252/8.55 B, 8.55 C, 8.55 E; 166/271, 300, 304, 305 R, 307, 311, 312

[56] References Cited

UNITED STATES PATENTS

| | | | |
|---|---|---|---|
| 3,493,049 | 2/1970 | Matthews et al. | 166/271 X |
| 1,608,869 | 11/1926 | Tilton | 166/304 X |
| 2,204,224 | 6/1940 | Limerick et al. | 166/307 UX |
| 2,356,205 | 8/1944 | Blair et al. | 166/307 UX |
| 3,254,718 | 6/1966 | Dunlap | 166/307 |
| 3,537,523 | 11/1970 | Gogarty et al. | 166/305 R |

OTHER PUBLICATIONS

The Condensed Chemical Dictionary, N.Y., Reinhold, 6th Ed., 1961. pp. 272, 273.

*Primary Examiner*—Stephen J. Novosad
*Attorney*—Joseph C. Herring, Richard C. Willson, Jr. and Jack L. Hummel

[57] ABSTRACT

The productivity index of a well in fluid communication with a reservoir is improved by injecting into the reservoir a displacing fluid to remove substantially all of the mobile oil from the immediate vicinity of the well bore, then injecting into the reservoir about 0.1–500 gallons of aqueous chromic acid solution per vertical foot of reservoir and thereafter permitting the well to produce. Desirably, sufficient amounts of the chromic acid solution are injected to contact the reservoir rock out to a radius of at least about 6 feet. Such a process is especially useful to increase the productivity index of reservoirs characteristic of a hydrocarbon or hydrocarbonlike coating on the reservoir rock.

9 Claims, No Drawings

STIMULATING PRODUCING WELLS WITH CHROMIC ACID

BACKGROUND OF THE INVENTION

1. Field of the Invention

This invention relates to increasing the productivity index of producing wells by first removing the mobile oil in the immediate vicinity of the well bore, then treating this area with an aqueous chromic acid solution.

2. Description of the Prior Art

U.S. Pat. No. 1,608,869 to Tilton teaches removing paraffin from a well bore by first removing naturally occurring liquids from the well, introducing an acid, e.g., sulfuric acid, and a water-soluble dichromate into the well and then removing dissolved paraffin from the well. Most of the paraffin is removed by heat generated by the reaction of acid and water. The potassium dichromate in the acid acts to dissolve the final film of paraffin adhering to mineral matter in the well.

U.S. Pat. No. 1,806,499 teaches facilitating the flow of hydrocarbon from wells by treating the well with an acid capable of evolving a large amount of heat upon mixing with water. Also, a gas-generating chemical is incorporated within the acid, the chemical preferably producing a gas soluble in oil. Examples of the gas-generating chemicals include calcium carbide and aluminum carbide. Examples of acids include hydrochloric acid and nitric acid.

U.S. Pat. No. 3,470,958 to Kinney teaches stimulating production wells with micellar dispersions.

SUMMARY OF THE INVENTION

Applicant has discovered a novel process of increasing the productivity index of a production well in a reservoir having substantially all of the mobile oil removed therefrom. This is effected by treating the formation, after the mobile oil is removed, with about 5 percent to about 67.5 percent by weight of $CrO_3$ dissolved in an aqueous medium. Then, permitting the well to produce.

DESCRIPTION OF PREFERRED EMBODIMENTS

Certain sandstones in the Appalachian Basin, e.g., the Bradford Third Sand, are characteristic of having a hydrocarbon or hydrocarbonlike coating on the sand grains. Such adversely affects production from these sandstones.

Such an adversity can be overcome by first removing the mobile oil in the immediate vicinity of the well bore, i.e., up to 15 feet in radius from the well bore, then contacting the reservoir rock or sandstone with an aqueous chromic acid solution. Thereafter, the production well is permitted to produce.

Visual inspection of the reservoir flooded with the aqueous chromic acid solution indicates that the hydrocarbon coating or dark residue surrounding the sand grains is removed.

As mentioned previously, the mobile oil must be substantially removed from the reservoir rock before it is contacted with the aqueous chromic acid solution. If not, the chromic acid tends to react with the mobile oil before coming in contact with the dark residue coating the sand grains.

Concentrations less than about 5 to about 67.5 percent (water saturated with $CrO_3$ at 100° C.) by weight of chromic acid ($CrO_3$) in an aqueous medium and preferably about 10 to about 50 percent are useful with the invention. More preferably, the concentration is at least about 20 percent. With concentrations in excess of 20 percent, a cross section of treated reservoir rock indicates a very distinct removal of the dark residue, i.e., the rock exhibits a very light texture. However, at concentrations of 10 percent chromic acid, there is certainly a visual change of the dark color of the reservoir rock to a lighter color, thus indicating removal of the hydrocarbon coating.

Volume amounts of about 0.1 to about 500 gallons or more of the chromic acid solution per vertical foot of reservoir rock are useful with this invention.

Other additives may be incorporated within the aqueous chromic acid solution. Such additives may be useful to impart desired characteristics that are particular to the reservoir and are desired by the particular operator of the reservoir. For example, corrosion inhibitors, surfactants, de-emulsifiers, etc., can be added.

Removal of the mobile oil can be effected by using flooding agents known in the art. For example, miscible or misciblelike slugs can precede the aqueous chromic acid solution. Optionally, a mobility reducing agent can be injected behind the displacing slug and this followed by the aqueous chromic acid solution. Where a micellar dispersion is used, it is preferred that an aqueous slug or aqueous mobility reducing agent slug be injected after the micellar dispersion and before the aqueous chromic acid solution is injected. Volume amounts of useful displacing agents, e.g., micellar dispersions, include from about 1 to about 500 gallons per vertical foot of reservoir rock. This can optionally be followed by equal volumes of water and this in turn followed by about 0.1 to about 500 gallons of the aqueous chromic acid solution per vertical foot of reservoir rock.

Preferably, sufficient amounts of the chromic acid solution are injected into the reservoir to contact the reservoir rock to a radius of up to about 15 feet or more. More preferably, sufficient amounts are injected to contact the reservoir rock to a radius of about 6–10 feet.

The aqueous chromic acid solution can be permitted to remain in contact with the reservoir rock, e.g., about 30 minutes or up to about 8 hours or more, to permit more efficient utilization of the chromic acid solution on the reservoir rock. That is, contact times of 30 minutes or more can enhance removal of the hydrocarbon coating on the reservoir rock.

After the aqueous chromic acid solution contacts the reservoir, and preferably after it has remained in contact with the rock for about 30 minutes to about 8 hours, the production well is permitted to produce. Thereafter, increased production from the well is realized.

The aqueous solution containing the chromic acid can be preheated before it is injected or it can be heated as it goes down the well bore. Such is useful to increase the effectiveness of the chromic acid to remove the hydrocarbon residue from the sand grains. Also, sequential slugging of aqueous solutions containing the chromic acid can be used with the invention. That is, a small aqueous slug of chromic acid can be injected followed by a slug(s) of water and then slug(s) of aqueous chromic acid solution, etc. Also, the chromic acid can be injected by pulsing the pressure during the injection of the chromic acid solution through the reservoir. Such may be helpful in particular reservoirs to "work" the chromic acid solution into the pores. Other methods known to the oil industry can be used with this invention.

The following example is presented to teach specific embodiments of the invention. Unless otherwise specified, percents are based on volume:

EXAMPLE I

One-inch core samples taken from the Bradford Third Sand in Pennsylvania are tested for permeabilities. The core samples are then treated with an aqueous solution containing the indicated amounts of chromic acid (see Table 1). Thereafter, the air permeability of the cores is determined at 100 p.s.i.g. Table 1 indicates the permeabilities before and after acid treatment, etc.

TABLE 1

| Core Sample | % $H_2CrO_4$ in Tap Water | K (md) to air Before Acid Treatment | K (md) to air After Acid Treatment |
|---|---|---|---|
| 1 | 40% | 32.8 | 53.9 |
| 2 | 40% | 136.2 | 314.0 |
| 3 | 40% | 73.1 | 121.7 |

The above data clearly shows that the use of chromic acid improves the relative permeability to the flow of air.

EXAMPLE II

A production well is first treated with an oil-external micellar dispersion followed by an equal volume of water and this in turn followed by an equal volume of chromic acid solution at 20 percent by weight concentration. Thereafter, the production well is permitted to produce. An increase in production rate is realized.

It is not intended that the above examples limit the invention. Rather, all equivalents known and obvious to those skilled in the art are intended to be incorporated within the invention as defined within the specification and appended claims.

What is claimed is:

1. A process of increasing the productivity index of a production well in fluid communication with an oil-bearing reservoir, the process comprising removing substantially all of the mobile oil within the immediate vicinity of the well bore, and then injecting into the reservoir within the immediate vicinity of the well bore an aqueous chromic acid solution and thereafter permitting the well to produce.

2. The process of claim 1 wherein a miscible or misciblelike displacing agent is injected into the reservoir to displace substantially all of the mobile oil.

3. The process of claim 2 wherein a micellar dispersion is used to displace the mobile oil.

4. The process of claim 1 wherein the aqueous chromic acid solution contains about 5 to about 67.5 percent by weight of chromic acid.

5. The process of claim 1 wherein about 0.1 to about 500 gallons of the aqueous chromic acid solution is injected into the reservoir per vertical foot of reservoir rock.

6. The process of claim 1 wherein sufficient amounts of chromic acid solution are injected into the reservoir to substantially contact the reservoir rock up to a distance of about 15 feet in radius from the well bore.

7. A process of increasing the productivity index of a production well in fluid communication with an oil-bearing reservoir comprising:
   1. injecting into the reservoir about 0.1 to about 500 gallons of a micellar dispersion per vertical foot of reservoir rock,
   2. injecting into the reservoir at least about an equal volume of water, based on the volume of the micellar dispersion injected, then
   3. injecting into the reservoir about 0.1 to about 500 gallons of an aqueous chromic acid solution per vertical foot of reservoir rock, and thereafter
   4. permitting the well to produce.

8. The process of claim 7 wherein the chromic acid solution contains about 5 to about 67.5 percent by weight of chromic acid.

9. The process of claim 7 wherein sufficient amount of chromic acid solution is injected to contact the reservoir rock up to a radius of at least about 6 feet from the well bore.

* * * * *